United States Patent [19]

Kumura

[11] Patent Number: 4,823,267

[45] Date of Patent: Apr. 18, 1989

[54] RATIO CONTROL FOR CONTINUOUSLY VARIABLE TRANSMISSION FOR AUTOMOTIVE VEHICLE

[75] Inventor: Haruyoshi Kumura, Kamakura, Japan

[73] Assignee: Nissan Motor Co., Ltd., Yokohama, Japan

[21] Appl. No.: 99,444

[22] Filed: Sep. 21, 1987

[30] Foreign Application Priority Data

Sep. 19, 1986 [JP] Japan .................. 61-219237

[51] Int. Cl.$^4$ .................. B60K 41/12; B60K 41/18; G06F 15/50
[52] U.S. Cl. .................. 364/424.1; 74/866
[58] Field of Search .................. 364/424.1; 180/233, 180/70.1, 73.1, 75; 74/665 T, 856, 861, 862, 865, 866

[56] References Cited

U.S. PATENT DOCUMENTS

| | | | |
|---|---|---|---|
| 3,893,344 | 7/1975 | Dontigraber et al. | 74/230.17 |
| 4,458,313 | 7/1984 | Smit et al. | 364/424.1 |
| 4,533,340 | 8/1985 | Abo et al. | 474/28 |
| 4,543,077 | 9/1985 | Yamamuro et al. | 474/12 |
| 4,559,029 | 12/1985 | Miranti, Jr. et al. | 474/251 |
| 4,579,021 | 4/1986 | Yamamuro et al. | 74/869 |
| 4,589,071 | 5/1986 | Yamamuro et al. | 364/424.1 |
| 4,590,561 | 5/1986 | Abo et al. | 364/424.1 |
| 4,597,308 | 7/1986 | Tanaka et al. | 74/866 |
| 4,603,602 | 8/1986 | Tanaka et al. | 74/866 |
| 4,637,277 | 1/1987 | Gaddi | 74/865 |
| 4,653,005 | 3/1987 | Osanai et al. | 364/424.1 |
| 4,660,440 | 4/1987 | Matsumura et al. | 74/866 |
| 4,665,775 | 5/1987 | Nagamatsu et al. | 74/868 |
| 4,669,336 | 6/1987 | Okada et al. | 74/867 |
| 4,670,843 | 6/1987 | Matsumura et al. | 364/424.1 |
| 4,702,128 | 10/1987 | Oshiage | 74/866 |
| 4,736,655 | 4/1988 | Kumura et al. | 364/424.1 X |

FOREIGN PATENT DOCUMENTS

| | | |
|---|---|---|
| 0092227 | 10/1983 | European Pat. Off. . |
| 0093413 | 11/1983 | European Pat. Off. . |
| 0111891 | 6/1984 | European Pat. Off. . |
| 3504763 | 10/1985 | Fed. Rep. of Germany . |
| 45-11250 | 4/1970 | Japan . |
| 49-103322 | 9/1974 | Japan . |
| 57-161346 | 10/1982 | Japan . |
| 58-170958 | 10/1983 | Japan . |
| 58-170959 | 10/1983 | Japan . |

OTHER PUBLICATIONS

Dubbel, "Taschenbuch fuer den Maschinenbau", Springer Verlag Berlin, 13th Edition, vol. 2, 1974, p. 883.
Stueper, "Automatische Automobilgetriebe", Springer-Verlag, Austria, 1965, pp. 301-309.
Samal, Grundriss der Praktischen Regelungstechnik, R. Oldenbourg Muenchen, 1960, pp. 310-318.
Abromeit, "Konzept einer Elektronischen Steuerung fuer ein Stufenloses Mechanisches Getriebe", Antriebstechnik, No. 24, 1985, pp. 49-51.

Primary Examiner—Eugene R. LaRoche
Assistant Examiner—David Mis
Attorney, Agent, or Firm—Foley & Lardner, Schwartz, Jeffery, Schwaab, Mack, Blumenthal & Evans

[57] ABSTRACT

A control system for a continuously variable transmission for an automotive vehicle, including a hydraulically operable driver pulley and follower pulley, a V-belt tensioned between the driver and follower pulleys, and means, including a shift actuator and a shift control valve, for hydraulically controlling a reduction ratio between the driver and follower pulleys by controlling a ratio of hydraulic fluid pressure applied to the driver pulley to hydraulic fluid pressure applied to the follower pulley. According to this control system, the continuously variable transmission is prohibited against effecting downshifting after predetermined conditions have been satisfied after application of the vehicle brake as detected by a brake sensor.

9 Claims, 15 Drawing Sheets

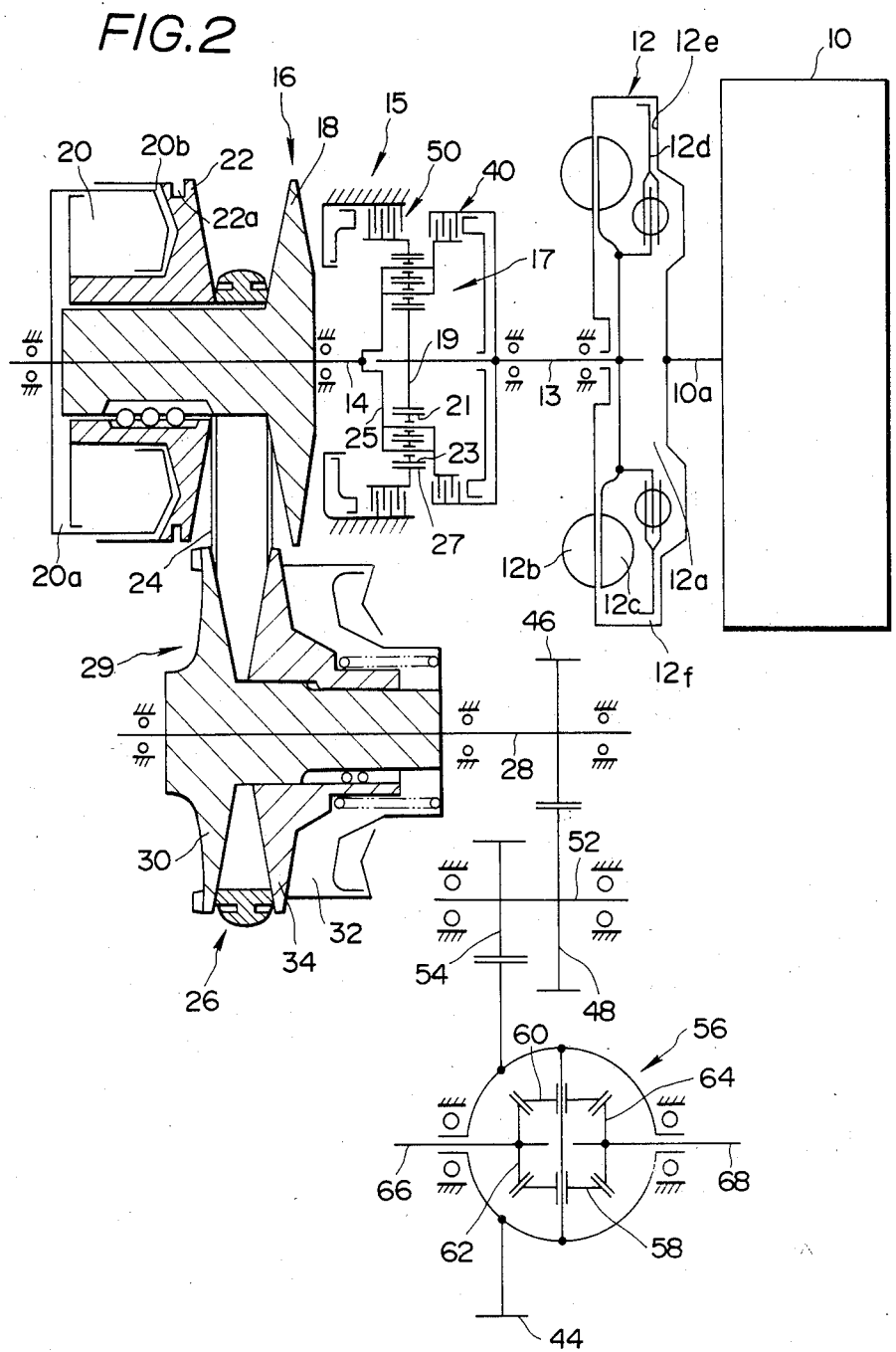

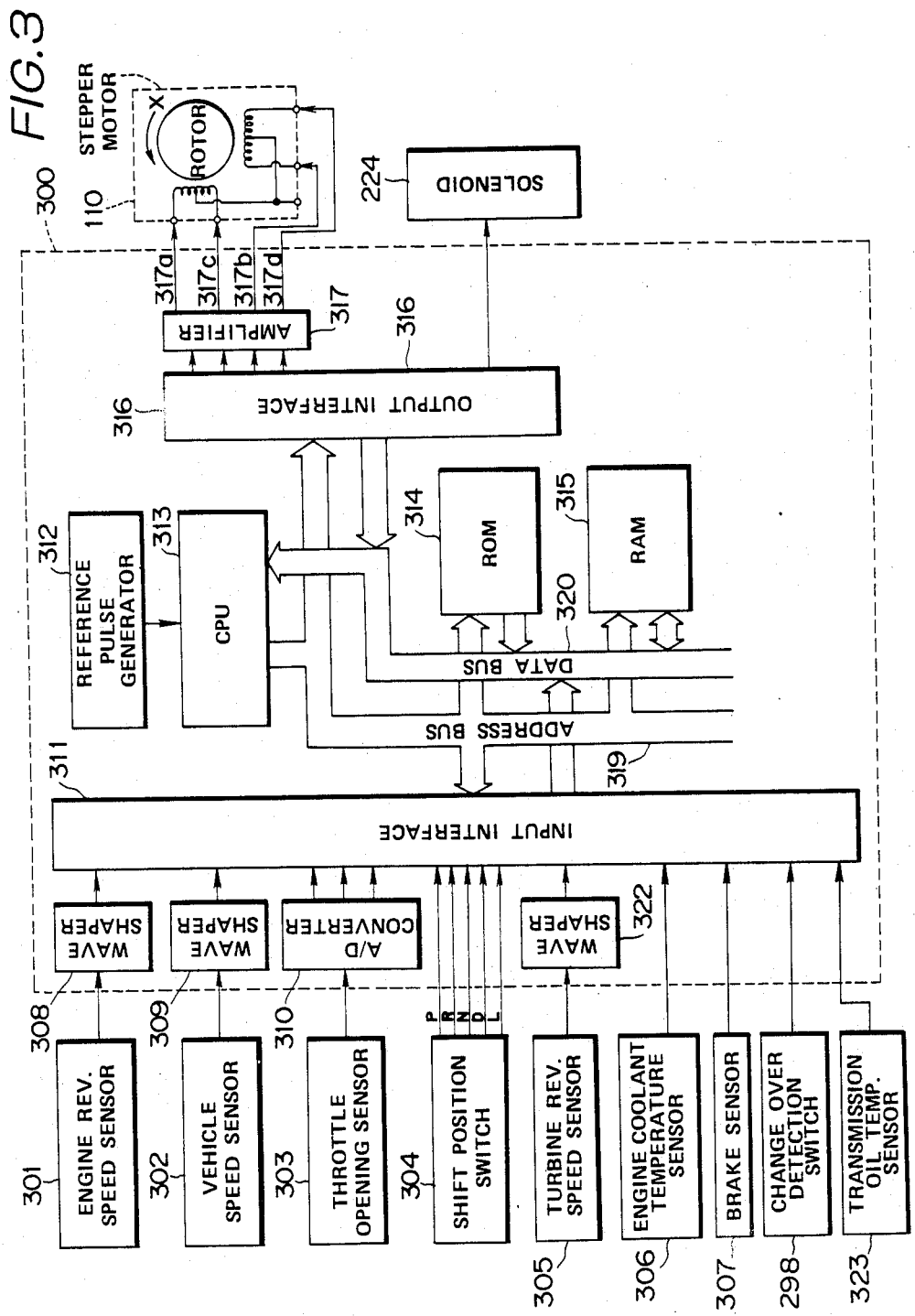

RATIO CONTROL FOR CONTINUOUSLY VARIABLE TRANSMISSION FOR AUTOMOTIVE VEHICLE

BACKGROUND OF THE INVENTION

The present invention relates to a reduction ratio control for a continuously variable transmission for an automotive vehicle.

In the case of an automotive vehicle having road wheels driven by an engine via a continuously variable transmission, the transmission downshifts toward the largest reduction ratio before the vehicle comes to a halt. This makes it easy for the vehicle to restart from a standstill. However, when the vehicle suddenly comes to a halt as a result of a panic braking, the transmission fails to establish the largest reduction ratio before the vehicle comes to a halt. In order to solve this problem, JP-A No. 49-103322 claiming priority on DE-A No. P2301776.7 discloses a ratio control for a continuously variable transmission wherein during a panic braking or a rapid braking, the discharge of hydraulic fluid from a driver pulley cylinder chamber is effected through by-pass fluid flow line bypassing flow restricting means provided for restraining the rate of hydraulic fluid discharged from the driver pulley cylinder chamber, and thus the downshifting is effected quickly during full and rapid braking.

DE No. 36 34 166 A1 discloses a continuously variable transmission. According to this continuously variable transmission, a stepper motor of a shift operating mechanism is controlled in a closed loop manner such that an actual pulse number indicative of an actual operating position of the stepper motor approaches a target pulse number that is determined as a function of a vehicle speed and a throttle opening degree. Let us assume that the automotive vehicle with this continuously variable transmission is running on a road having a low friction coefficient. If the driver depress the brake pedal under this running condition, the vehicle starts sliding with its braked wheels being locked. Since the wheel speed is detected and used as the vehicle speed, the vehicle speed is 0 so that the transmission effects downshifting by discharging hydraulic fluid from the driver pulley cylinder chamber. This causes not only a drop in the hydraulic fluid pressure applied to the driver pulley, but also a drop in hydraulic fluid pressure applied to the follower pulley. Thus, the tension on the V-belt considerably drops. Under this condition, if the vehicle enters a road having a relatively high friction coefficient, the braked road wheels are forced to rotate owing to the inertia of the vehicle. This forced rotation of the road wheels causes the V-belt to slip relative to the driver and follower pulleys. The occurrence of slip of the V-belt causes not only damages of the V-belt, but also damages on the driver and follower pulleys. Thus operating life of the continuously variable transmission becomes short.

An object of the present invention is to improve the continuously variable transmission discussed as above such that the V-belt is prevented from slipping particularly during quick or rapid braking.

SUMMARY OF THE INVENTION

According to the present invention, the above mentioned downshifting of the transmission is prohibited or prevented after predetermined conditions have been established after application of a brake, so that hydraulic fluid pressure applied to a driver pulley and that applied to a follower pulley are maintained high enough to keep the tension on the V-belt at a sufficiently high level.

Thus, even if the braked road wheels are forced to rotate when the vehicle enters a road having a relatively high friction coefficient, the V-belt is prevented from slipping as long as the downshifting is prohibited.

The prohibition of the downshifting is released upon elapse of a predetermined length of time and if the brake is still applied after the elapse of the predetermined length of time, the continuously variable transmission is allowed to downshift toward the largest reduction ratio.

The predetermined length of time is determined as a function of a vehicle speed detected upon or immediately before the application of the brake, or as a function of not only the vehicle speed but also a wheel deceleration.

BRIEF DESCRIPTION OF THE DRAWINGS

FIG. 2 is a schematic diagram showing a power transfer mechanism of the continuously variable transmission;

FIG. 3 is a block diagram showing a control unit operatively connected with a stepper motor and a solenoid of an electromagnetically operated valve shown in FIGS. 1A and 1B;

DETAILED DESCRIPTION OF THE INVENTION

Figure 1A:
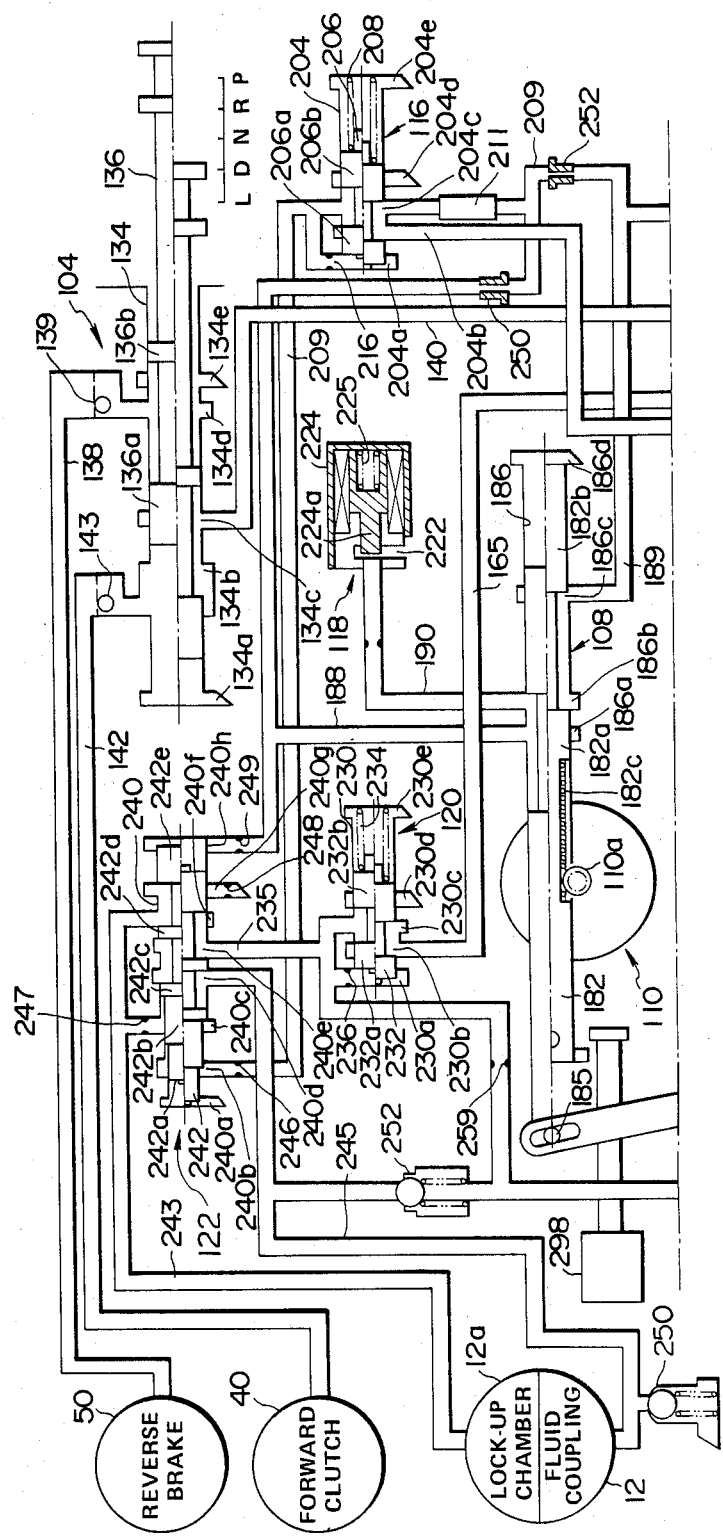
FIGS. 1A and 1B, when combined, illustrate a hydraulic circuit diagram showing a control system for a continuously variable transmission embodying the present invention.

Referring to FIG. 2. an engine 10 of an automotive vehicle is shown. The engine 10 has an output shaft 10a coupled with a fluid coupling 12 including a pump impeller 12b and a turbine runner 12c, and a lock-up mechanism. The lock-up mechanism includes a friction clutch element 12d rotatable with the turbine runner 12c. The clutch element 12d divides the inside of the fluid coupling 12 into two chambers and defines a lock-up chamber 12a. When it is in the illustrated position in FIG. 2, clutch element 12d is disengaged from the adjacent end wall 12e rotatable with pump impeller 12b. This illustrated position is established when hydraulic fluid is supplied to the lock-up chamber 12a. The hydraulic fluid is then allowed to pass through a clearance 12f formed around the outer periphery of the clutch element 12d to flow into the inside of the fluid coupling 12. When the hydraulic fluid is discharged from the lock-up chamber 12a and the hydraulic fluid is supplied directly into the inside of the fluid coupling 12, there occurs a pressure difference across the clutch element 12d urging same into firm engagement with the adjacent wall 12e. The turbine runner 12c of the fluid coupling 12 is coupled with a rotary shaft 13. The rotary shaft 13 is coupled with a forward/reverse drive change-over mechanism 15. The forward/reverse drive change-over mechanism 15 has a planetary gearing 17, a forward clutch 40, and a reverse brake 50. The planetary gearing 17 comprises a sun gear 19, a pinion carrier 25 having two pinions 21, 23, and a ring gear 27. The two pinions 21, 23 are intermeshed, the pinion 21 meshes with the sun gear 19, and the pinion 23 meshes with the ring gear 27. The sun gear 19 is connected to the rotary shaft 13 for unitary rotation therewith. The pinion carrier 25 is selectively connected to the rotary shaft 13 via the forward clutch 40. The ring gear 27 is selectively held stationary via the reverse brake 50. The pinion carrier 25 is connected to a driver shaft 14 arranged coaxially with the rotary shaft 13. Mounted on the driver shaft 14 is a driver pulley 16. The driver pulley 16 comprises an axially stationary conical disk 18, and an axially movable conical disk 22 that is arranged in opposed relationship with axially stationary conical disk 18 so as to define a V-shaped pulley groove therebetween and displaceable in axial direction of driver shaft 14 under bias of hydraulic fluid pressure applied to a driver pulley cylinder chamber 20 (servo chamber). The driver pulley cylinder chamber 20 comprises two chambers 20a and 20b, and has a pressure acting area twice as large as a pressure acting area of a later described follower pulley cylinder chamber 32 (servo chamber). The driver pulley 16 is drivingly connected to a follower pulley 26 via a V-belt 24. The follower pulley 26 is mounted on a follower shaft 28. The follower pulley 26 comprises an axially stationary conical disk 30 rotatable with the follower shaft 28, and an axially movable conical disk 34 that is arranged in opposed relationship with the axially stationary conical disk 30 so as to define a V-shaped pulley groove and displaceable in axial direction of the follower shaft 28 under the bias of a hydraulic fluid pressure applied to the follower pulley cylinder chamber 32. The driver pulley 16, V-belt 24, and follower pulley 26 cooperate with each other to constitute a continuously variable V-belt transmission mechanism 29. Fixedly connected to the follower shaft 28 is a driver gear 46 which is in mesh with an idler gear 48 rotatable with an idler shaft 52. The idler shaft 52 has a pinion 54 rotatable therewith, the pinion 54 being in mesh with a final gear 44. A pair of pinions 58 and 60 that form a part of a differential 56 are fixedly connected to the final gear 44 for rotation therewith. The pinions 58, 60 are in mesh with a pair of side gears 62, 64, respectively, which are fixedly coupled with a pair of axles 66, 68, respectively. The axles 66, 68 are connected to road wheels of an automotive vehicle, respectively.

An engine torque on the engine output shaft 10a is transferred via the fluid coupling 12 and the rotary shaft 13 to the forward/reverse drive change-over mechanism 15 where the direction of the torque is switched, if necessary. With the forward clutch 40 engaged and the reverse brake 50 released, the torque of the rotary shaft 13 is transferred via the planetary gearing 17 to drive same in the forward direction. With the forward clutch 40 released and the reverse brake 50 engaged, the planetary gearing 17 acts to change the direction of the torque and transfers the torque of the rotary shaft 13 to the driver shaft 14 to drive same in the reverse direction. The torque transferred to the driver shaft 14 is transferred via driver pulley 16, V-belt 24, follower pulley 26, follower shaft 28, driver gear 46, idler gear 48, idler shaft 52, pinion gear 54, and final gear 44, differential 56 to the axles 66, 68. When both the forward clutch 40 and the reverse brake 50 are released, the transmission of torque in interrupted. A ratio of rotation between the driver pulley 16 and the follower pulley 26 is variable by altering the running diameter of the V-belt 24 on the driver pulley 16 and that of the V-belt 24 on the follower pulley 26.

Figure 1B:
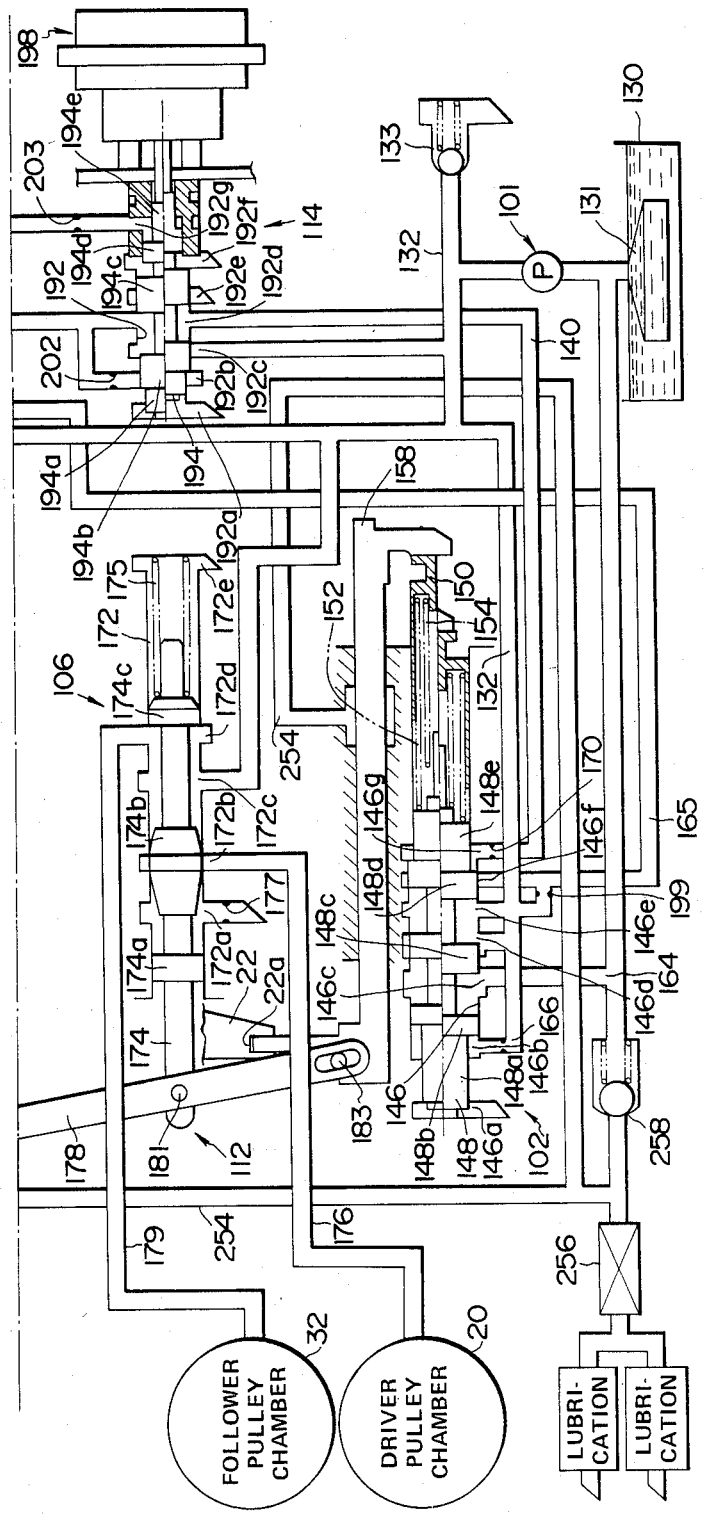

Hereinafter, a hydraulic pressure control system for the above mentioned continuously variable transmission is described. As shown in FIGS. 1A and 1B, it comprises a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, a solenoid operated valve 118, a coupling pressure regulator valve 120, and a lock-up control valve 122.

The hydraulic fluid pump 101 draws in hydraulic fluid (oil) from a tank 130 via a strainer 131, and discharge it into a hydraulic fluid line 132. Hydraulic fluid line 132 conducts the discharged fluid to ports 146b, 146d and 146e of the line pressure regulator valve 102 where pressure regulation is effected to generate a line pressure. The hydraulic fluid line 132 is allowed to communicate with a port 192c of the throttle valve 114 and a port 172c of the shift control valve 106. The fluid line 132 communicates also with a port 204b of the constant pressure regulator valve 116. Provided in the fluid line 132 is a line pressure relief valve 133 that prevents abnormal increase in the line pressure.

The manual valve 104 has a valve bore 134, formed within a valve body, that is provided with five ports 134a, 134b, 134c, 134d, and 134e, and a spool 136 having two lands 136a and 136b which cooperate with the valve bore 134. The spool 136 which is urged to move by a selector lever (not shown), has five detent positions, namely P, R, N, D, and L range positions. The ports 134a and 134e, are drain ports, and the port 134b communicates with the forward clutch 40 via the hydraulic fluid line 142. The hydraulic fluid line 142 is provided with a one-way orifice 143 that provides a throttling effect only when hydraulic fluid is supplied to the forward clutch 40. The port 134c communicates via a hydraulic fluid line 140 with ports 192b and 192d of the throttle valve 114, and the port 134d communicates via a hydraulic fluid line 138 with the reverse brake 50. The hydraulic fluid line 138 is provided with a one-way orifice 139 that provides a throttling effect only when the hydraulic fluid is supplied to the reverse brake 50. When the spool 136 assumes the P range position, the land 136a closes the port 134c that is supplied with the throttle pressure via the hydraulic fluid line 140 from the throttle valve 114 (clutch pressure regulator valve), the forward clutch 40 is drained via a hydraulic fluid line 142 and the drain port 134a, and the reverse brake 50 is drained via a hydraulic fluid line 138 and the drain port 134e. When the spool 136 assumes the R range position, the ports 134c and 134d are allowed to communicate with each other via a space within the valve bore 134 defined between the lands 136a and 136b, and thus the reverse brake 50 is supplied with the throttle pressure, whereas the forward clutch 40 is drained via the port 134a. When the spool 136 assumes the N position, the port 134c is positioned between the lands 136a and 136b, and thus it is prevented from communicating with the other ports, whereas the ports 134b and 134d are drained, so that the reverse brake 50 and the forward clutch 40 are both drained. When the spool 136 assumes the D or L range position, the ports 134b and 134c are allowed to communicate with each other via the space within the valve bore 134 defined between the lands 136a and 136b, allowing supply of the throttle pressure to the forward clutch 40, whereas the reverse brake 50 is drained via port 134e.

The line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between the spool 148 and the sleeve 150. The sleeve 150 in abutting engagement with a bias member 158 is urged to move to the left as viewed in FIGS. 1A and 1B in response to the leftward movement of the bias member 158. The bias member 158 is mounted within the valve body in parallel to the axis of the valve bore 146, and it is formed, at the opposite end portion, with an integral arm meshing with a circumferential groove 22a with which the axially movable conical disk 22 of the driver pulley 16 is formed. Arrangement is such that an increase in reduction ratio causes movement of the sleeve 150 to the left as viewed in FIGS. 1A and 1B, whereas a decrease in reduction ratio causes movement of the sleeve 150 to the right as viewed in FIGS. 1A and 1B. Among two springs 152 and 154, the spring 152 arranged outside has opposite ends thereof always engaged by the sleeve 150 and the spool 148 and thus is always in its compressed state, whereas the spring 154 inside is not compressed until the sleeve 150 is moved to the left from a position indicated by the upper half thereof by a predetermined distance. The port 146a of the line pressure regulator valve 102 is a drain port. The port 146g is supplied with the throttle pressure from the hydraulic fluid line 140 that serves as a throttle pressure circuit. The port 146c communicates with the hydraulic fluid line 164 that serves as a drain circuit. The ports 146b, 146d, and 146e communicate with the hydraulic fluid line 132 that serves as a line pressure circuit. The port 146f communicates via a hydraulic fluid line 165 with a port 230b of the coupling pressure regulator valve 120. The hydraulic fluid line 165 communicates with the fluid line 132 via an orifice 199. Inlets to the ports 146b and 146g are provided with orifices 166 and 170, respectively. As will now be understood, the spool 148 of line pressure regulator valve 102 is subject to two forces directed to the left as viewed in FIG. 1A and 1B, one due to the spring 152 alone (or both of the springs 152 and 154) and the other resulting from the hydraulic fluid pressure (throttle pressure) supplied to the port 146g to act on a differential area between the lands 148d and 148e, and it is also subject to a force directed to the right as viewed in FIGS. 1A and 1B resulting from the hydraulic fluid pressure (line pressure) supplied to the port 146b to act on a differential area between the lands 148a and 148b. Thus, the spool 148 effects pressure regulation to generate the line pressure by adjusting the amount of flow of hydraulic fluid from the port 146d toward the port 146c until equilibrium state is established wherein the above mentioned forces directed to the left and to the right balance with each other. The characteristic of the line pressure is such that it increases as the reduction ratio becomes large, and it increases also in response to an increase in throttle pressure supplied to the port 146g. The above-mentioned characteristic of the line pressure meets the demand that a force with which the pulley discs grip the V-belt be increased as the reduction ratio becomes large and the engine output torque increases.

The shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing the spool 174 to the left as viewed in FIGS. 1A and 1B. The port 172b communicates via a hydraulic fluid line 176 with the driver pulley cylinder chamber 20, and the ports 172a and 172e are drain ports. The outlet of the port 172a is provided with an orifice 177. The port 172d communicates via a hydraulic fluid line 179 with the follower pulley cylinder chamber 32. The port 172c communicates with the hydraulic fluid line 132 that serves as the line pressure circuit, and thus supplied with the line pressure. Left end of the spool 174 is rotatably mounted on a lever 178 of the shift operation mechanism 112 by a pin 181 at a generally middle portion thereof. Because the land 174b has an axial cross sectional configuration defined by a curved boundary, hydraulic fluid supplied to the port 172c at line pressure mainly flows into the port 172b, but it is partially discharged to the port 172a. As a result, hydraulic pressure developed in the port 172b is determined by a ratio of the amount of incoming flow into this port to the amount of discharging flow. Thus, the leftward movement of the spool 174 causes a decrease in clearance disposed on the discharge side and an increase in clearance disposed on the line pressure side, resulting in an increase in hydraulic pressure developed in the port 172b. Usually, the port 172d is supplied with the line pressure applied to port 172c. The hydraulic pressure at the port 172b is supplied via the hydraulic fluid line 176 to the driver pulley cylinder chamber 20, whereas the hydraulic pressure at the port 172d is supplied via the hydraulic fluid line 179 to the follower pulley cylinder chamber 32. As a result, the leftward movement of spool 174 causes an increase in the hydraulic pressure in the driver pulley cylinder chamber 20, resulting in a decrease in width of the V-shaped pulley groove of driver pulley 16. That is, this causes an increase in running diameter of the V-belt 24 on the driver pulley 16, and a decrease in running diameter of the V-belt 26 on the follower pulley 26, thus causing a decrease in reduction ratio. Rightward movement of spool 174 causes the reverse process to take place, thus causing an increase in reduction ratio.

Although, as mentioned before, the lever 178 of shift operation mechanism 112 has middle portion thereof connected to the spool 174 by the pin 181 and has one end connected to the before mentioned bias member 158 by the pin 183, the opposite end of the lever 178 is connected to a rod 182 by a pin 185. The rod 182 is formed with a rack 182c that meshes with a pinion 110a of the shift motor 110. With this shift operation mechanism 112, if the pinion 110a of the shift motor 110 that is subject to control of the control unit 300 is rotated in such a direction as to cause the rod 182 to move to the right as viewed in FIGS. 1A and 1B, this rightward movement of the rod 182 causes the lever 178 to swing about the pin 183 clockwise, thus urging the spool 174 of the shift control valve 106 for moving to the right. As described previously, his causes the axially movable conical disc 22 of the driver pulley 16 to move to the left as viewed in FIGS. 1A and 1B, thus causing an increase in width of the V-shaped pulley groove of driver pulley 16, resulting in an increase in reduction ratio. Because the one end of the lever 178 is linked to the bias member 158 by the pin 183, the above mentioned movement of the axially movable conical disk 22 causes the bias member 158 to move to the left as viewed in FIGS. 1A and 1B. This leftward movement of the bias member 158 causes the lever 178 to swing about the pin 185 disposed on the other end thereof clockwise. Thus, the spool 174 is pulled back to the left, tending to cause a decrease in reduction ratio. After repeating this process, the spool 174, the driver pulley 16, and the follower pulley 26 establish a new stable reduction ratio state corresponding to a new operating position assumed by the shift motor 110. If the shift motor 110 is rotated in the opposite direction so as to urge the rod 182 to the left, this leftward movement of the rod 182 causes the associated members to move until they assume a new stable reduction ratio state corresponding to a new rotary position of shift motor 110. The rod 182 is movable beyond the position corresponding to the maximum reduction ratio and further to the right, as viewed in FIGS. 1A and 1B, into an overstroke range. This movement of the rod 182 into the overstroke range will turn on a change-over detection switch 298. From the preceding description, it will now be understood that if the shift motor 110 is rotated in accordance with a predetermined pattern, the reduction ratio will vary accordingly, so that it is possible to control the reduction ratio of the continuously variable transmission by the shift motor 110.

The shift motor 110 (which will be hereinafter called as "stepper motor") is so controlled as to assume an operating position that is determined in correspondance with a pulse number signal determined in the control unit 300. The control unit 300 gives pulse number signal in accordance with a predetermined shift pattern.

The adjustment pressure change-over valve 108 has a valve element thereof formed integrally with the rod 182 of the shift operation mechanism 112. That is, the adjustment pressure change-over valve 108 has a valve bore 186, formed within the valve body, that is provided with ports 186a, 186b, 186c, and 186d, and lands 182a and 182b formed on the rod 182. The port 186a communicates with a hydraulic fluid line 188. The port 186b communicates with the solenoid operated valve 118 via a drain conduit 190. The port 186c communicates with a hydraulic fluid line 189. The port 186d is a drain port. Normally, the port 186a and the port 186b are allowed to communicate with each other via a space defined within the valve bore between the lands 182a and 182b, but when the rod 182 is displaced into the overstroke range beyond the maximum reduction ratio corresponding position, the port 186a is closed and the port 186b is allowed to communicate with port 186c.

The throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases the spool 194. When the engine intake manifold vacuum is lower than a predetermined value, for example, 300 mmHg, (viz., when the engine intake manifold vacuum is near the atmospheric level), the vacuum diaphragm 198 biases the spool 194 with a force that is in inverse proportion to the magnitude of the vacuum, whereas when the intake manifold vacuum is higher than the predetermined value, it applies no force to the spool 194. The port 192a is a drain port, the ports 192b and 192d communicate with the hydraulic fluid line 140 serving as the throttle pressure circuit, the port 192c communicates with the hydraulic fluid line 132 serving as the line pressure circuit, the port 192e is a drain port, and the port 192g communicates with the before mentioned hydraulic fluid line 189. The inlets to the ports 192b and 192g are provided with orifices 202 and 203, respectively. The spool 194 is subject to two forces directed to the left as viewed in FIGS. 1A and 1B, one resulting from the hydraulic fluid pressure supplied to port 192g to act on a differential area between the lands 194d and 194e and the other by the vacuum diaphragm 198, and it is also subject to a force, directed to the right as viewed in FIGS. 1A and 1B resulting from the hydraulic fluid pressure supplied to port 192b to act on a differential area between the lands 194a and 194b. The throttle valve 114 effects a pressure regulation until the above mentioned forces balance with each other by using the line pressure supplied to the port 192c as a pressure source and the port 192e as a discharge port. The characteristic of the throttle pressure developed at the ports 192b and 192d is such that it increases as the engine intake manifold vacuum decreases. The magnitude of the throttle pressure is adjustable by varying the adjustment pressure supplied to the port 192g.

The constant pressure regulator valve 116 has a valve bore 204, formed in the valve body, that is provided with ports 204a, 204b, 204c, 204d, and 204e, a spool 206 having lands 206a and 206b, and a spring 208 biasing the spool 206 to the left as viewed in FIGS. 1A and 1B. The ports 204a and 204c communicate with a hydraulic fluid line 209. The port 204b communicates with the hydraulic fluid line 132 serving as the line pressure circuit. The ports 204d and 204e are drain ports. The inlet to the port 204a is provided with an orifice 216. The constant pressure regulator valve 116 effects a pressure regulation to provide a constant hydraulic fluid pressure corresponding to the force of spring 208 in hydraulic fluid line 209. The hydraulic fluid line 209 is connected via a choke type throttle valve 250 with the hydraulic fluid line 188 and it is connected via a choke type throttle valve 252 with the hydraulic fluid line 189. The hydraulic fluid line 209 is provided with a filter 211.

The solenoid operated valve 118 is so constructed as to adjust the discharge, in amount, of hydraulic fluid from the drain conduit 190 to a drain port 222. The adjustment is made by a plunger 224a biased by a spring 225 toward a closed position where the discharge is prohibited under the control of a solenoid coil 224. Solenoid coil 224 is subject to pulse duty factor control by control unit 300. Since amount of hydraulic fluid discharged is in inverse proportion to amount of current passing through the solenoid 224, the hydraulic fluid pressure (adjustment pressure) is variable in inverse proportion to the amount of current passing through the solenoid 224.

The coupling pressure regulator valve 120 has a valve bore 230, formed in the valve body, that is provided with ports 230a, 230b, 230c, 230d and 230e, a spool 232 having lands 232a and 232b, and a spring 234 biasing the spool 232 to the left as viewed in FIGS. 1A and 1B. The ports 230a and 230c communicate with a hydraulic fluid line 235, the port 230b is supplied via the hydraulic fluid line 165 with hydraulic fluid which is discharged by the line pressure regulator valve 102, and the ports 230d and 230e are drain ports. The inlet to the port 230a is provided with an orifice 236. The coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to the hydraulic fluid line 235. This coupling pressure is used as a working pressure within the fluid coupling 12, and it is also used to actuate the lock-up mechanism.

The lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. The ports 240a and 240g are drain ports, port 240b communicates with the hydraulic fluid line 209, the ports 240c and 240f communicate via the hydraulic fluid line 243 with the lock-up chamber 12a, the port 240d is connected with the hydraulic fluid line 245 that communicates with the fluid coupling 12. The port 240e is supplied with the constant coupling pressure from the hydraulic fluid line 235. The port 240h is connected with the before mentioned hydraulic fluid line 188. The inlets to the ports 240b, 240c, 240g, and 240h are provided with orifices 246, 247, 248, and 249, respectively. This lock-up control valve 122 controls the supply of hydraulic fluid pressure to the fluid coupling 12 and that to the lock-up chamber 12a. The spool 242 shifts from one position to another position when the following three forces attain a predetermined relationship, one due to hydraulic fluid pressure (i.e., constant fluid pressure obtained after pressure regulation by constant pressure regulator valve 116) supplied to the port 240b to act on a differential area between the lands 242a and 242b, another due to hydraulic fluid pressure supplied to the port 240c to act on a differential area between the lands 242b and 242c, and the other due to hydraulic fluid pressure supplied to the port 240h to act on axial end of the land 242e. When the spool 242 assumes a lock-up position indicated by the upper half thereof, the port 240f is allowed to communicate with the port 240g via a space defined in the valve bore between the lands 242d and 242e, thus allowing the lock-up chamber 12a to be drained via the port 240g. In this lock-up position, the port 240d is allowed to communicate with the port 240e via a space defined in the valve bore between the lands 242c and 242d, thus allowing the supply of the coupling pressure generated by the coupling pressure regulator valve 120 to the inside of the fluid coupling 12 via the fluid line 245. As a result, the lock-up mechanism assumes the lock-up state. The hydraulic fluid line 245 is provided with a relief valve 250 that prevents application of abnormally high pressure to the fluid coupling 12. When, on the other hand, the spool 242 assumes a release position indicated by the lower half thereof as illustrated in FIGS. 1A and 1B, the port 240e is allowed to communicate with the port 240f via a space defined within the valve bore between the lands 242d and 242e, thus allowing the supply of the coupling pressure to the lock-up chamber 12a via the hydraulic fluid line 243.

The port 240d, in this position, is sealed by the lands 242c and 242d. As a result, the lock up mechanism assumes the release state, thus providing a state wherein the hydraulic fluid is supplied, as working fluid pressure, to the inside of the fluid coupling 12 via the lock-up chamber 12a past the clearance 12f (see FIG. 2). The hydraulic fluid pressure within the fluid coupling 12 is kept at a constant value by means of a pressure maintaining valve 252. The hydraulic fluid discharged by the pressure maintaining valve 252 is supplied via a hydraulic fluid line 254 to a cooler 256 where it is cooled before used for lubrication. The hydraulic fluid line 254 is provided with a cooler pressure maintaining valve 258. The hydraulic fluid discharged by the cooler pressure maintaining valve 258 returns via a hydraulic fluid line 164 to intake port of the hydraulic fluid pump 101. The hydraulic fluid line 254 leads to an area where the bias member 158 is slidably engaged with the valve body to lubricate there. The hydraulic fluid line 254 is connected via an orifice 259 with the hydraulic fluid line 235 to secure minimal supply of hydraulic fluid.

Hereinafter, the control unit 300 is further described.

As shown in FIG. 3, the control unit 300 is supplied with electric signals, as input signals, from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, a brake sensor 307, and a transmission oil temperature sensor 323. The engine revolution speed sensor 301 detects engine revolution speed by counting the number of engine ignition spark pulses, and the vehicle speed sensor 302 detects vehicle speed by measuring rotation of the output shaft of the continuously variable transmission. The throttle opening sensor 303 detects engine throttle opening degree in terms of an electric voltage. The shift position switch 304 detects which of positions P, R, N, D, and L the before mentioned manual valve 104 assumes. The turbine revolution speed sensor 305 detects the revolution speed of the turbine shaft of the fluid coupling 12. The change-over detection switch 298 is turned ON when the rod 182 of the shift operation mechanism 112 moves further beyond the maximum reduction ratio corresponding position (i.e., when the rod 182 is disposed in the overstroke range). The engine coolant temperature sensor 306 generates an output signal when engine coolant temperature is lower than a predetermined value. The brake sensor 307 detects whether vehicle brake is used. The transmission oil temperature sensor detects the oil temperature of the continuously variable transmission. Output signals from engine revolution speed sensor 301, vehicle speed sensor 302, and turbine revolution speed sensor 305 are supplied via associated wave shapers 308 and 309 to an input interface 311. Electric voltage signal from the throttle opening sensor 303 is converted into a digital signal at an AD converter 310 before supplied to the input interface 311. The control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. What are stored in ROM 314 include a program for control of stepper motor 110 and control of solenoid 224. RAM 317 temporarily stores information from various sensors and switch and parameters necessary for control. Output signals of the control unit 300 is supplied via output interface 316 and an amplifier 317 to the stepper motor 110 and via input interface 316 to the solenoid 224.

Figure 4:
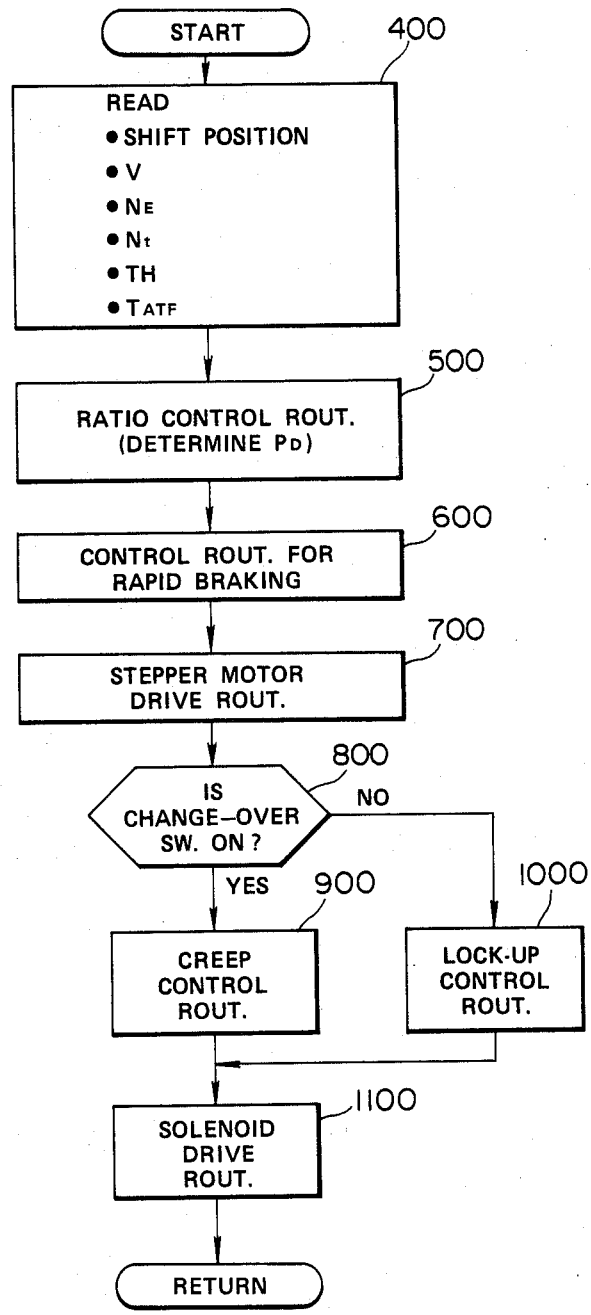
FIG. 4 is a general flow diagram of various controls performed by the control unit.

Referring now to FIG. 4, a general flow of various control routines performed by the control unit 300 shown in FIG. 3 is described.

In a routine 400, a shift position (P, R, N, D, L), a vehicle speed (viz. a vehicle wheel speed) V, an engine revolution speed $N_E$, a driver pulley revolution speed (viz. a turbine revolution speed) $N_t$, a throttle opening degree TH, and a transmission oil temperature $T_{ATF}$ are determined by reading data via the input interface 311 from the shift position switch 304, the vehicle speed sensor 302, the engine revolution speed sensor 301, the turbine revolution speed sensor 305, the throttle opening degree sensor 303, and the transmission oil temperature sensor 323, respectively. After this routine 400, a ratio control routine 500 is executed. In this routine 500, a target driver pulley or turbine revolution speed is determined based on the shift position, the vehicle speed V, and the throttle opening degree, and a target pulse number indicative of a target stepper motor position corresponding to the target driver pulley revolution speed is determined. Subsequently, a control routine for rapid braking 600 which will be later described in detail is executed. After this control routine 600, a stepper motor 110 is controlled in accordance with the content of $P_D$ which has been determined in the routine 500 or which has been replaced with a new value in the control routine 600. Specifically saying, the stepper motor 110 is rotated in such a direction as to reduce a difference between an actual stepper motor pulse number $P_A$ and the target pulse number $P_D$ toward zero. Then, depending on the judgement made at a step 800, a creep control routine 900 or a lock-up control routine 1000 is executed. At the step 800, a decision is made whether a change-over switch 298 (see FIG. 1A) is ON or not. After determining a duty factor supplied to a solenoid 224 in the creep control routine 900 or the lock-up control routine 1000, the current passing through the solenoid 224 of an electromagnetically operated (solenoid operated) valve 118 (see FIG. 1A) is controlled in accordance with the duty factor in a solenoid drive routine 1100. The above mentioned routines 400, 500, 700, 900, 1000 and 1100 may be well understand from the description of copending U.S. patent application Ser. No. 915,681 filed Oct. 6, 1986 which have been assigned to the same assignee to which the present application is to be assigned. This copending application is hereby incorporated by reference.

Figure 5A:
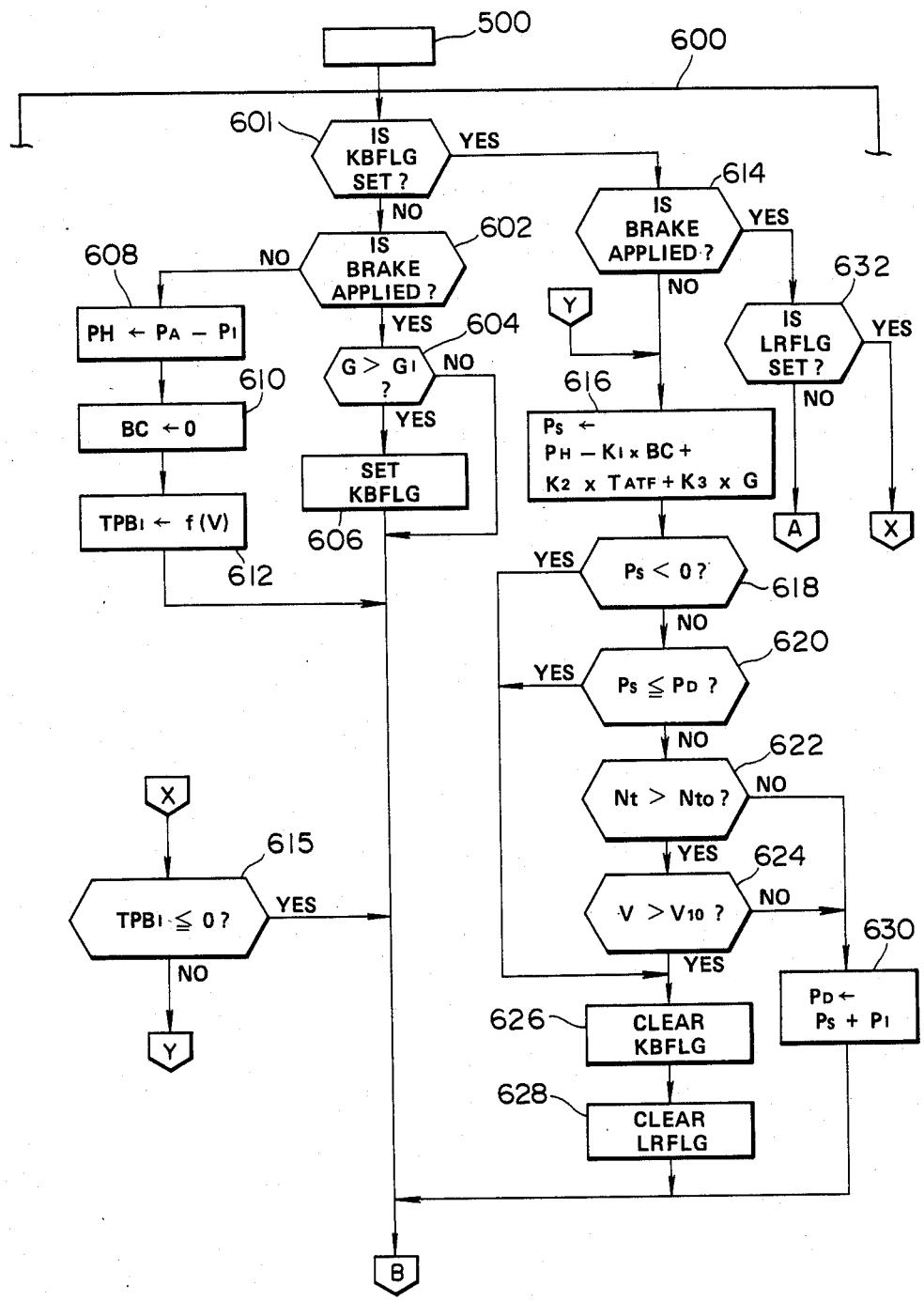
FIGS. 5A and 5B, when combined, illustrate a flowchart of a control routine for rapid braking.
Figure 5B:
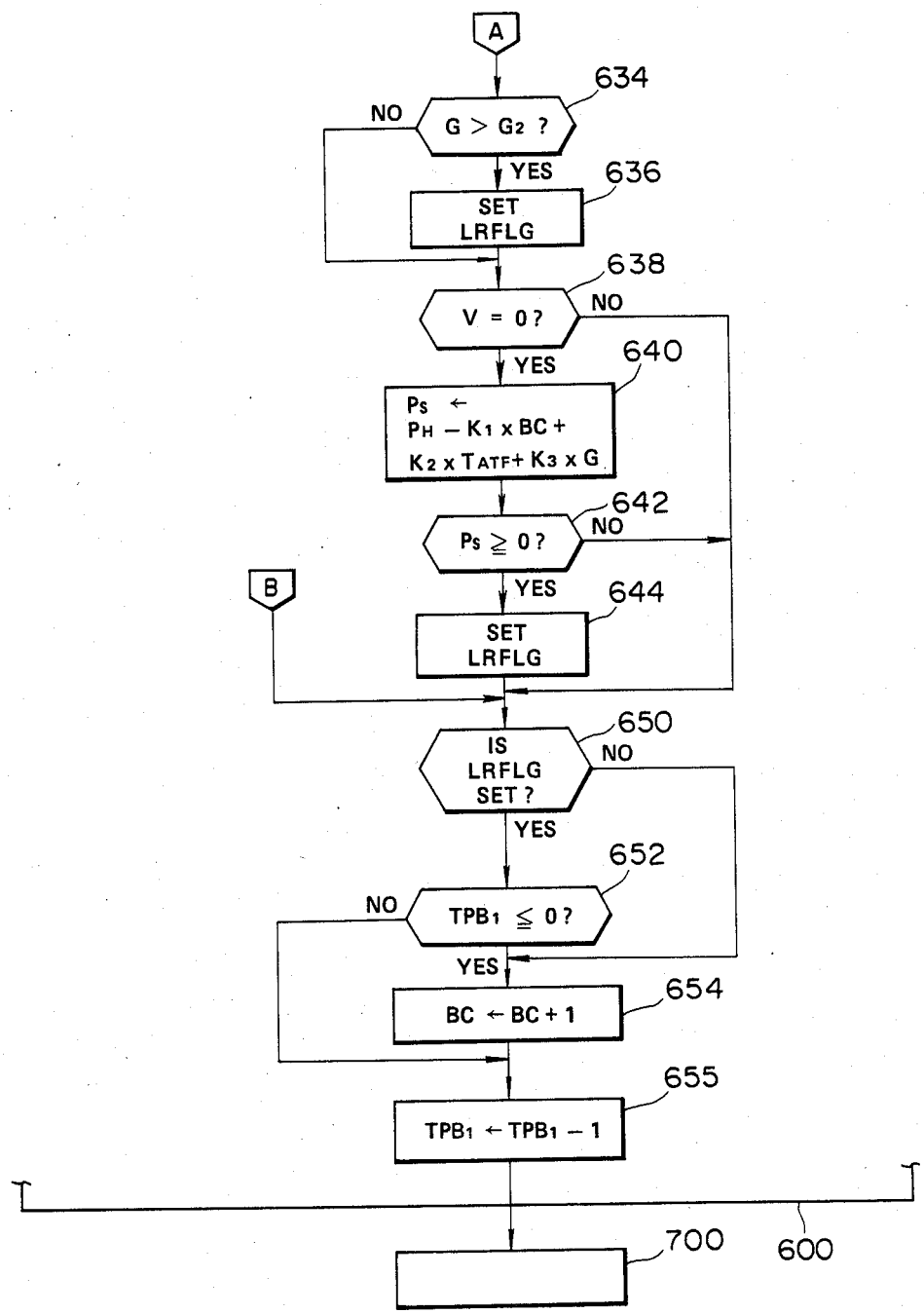

The above-mentioned control routine 600 for rapid braking is explained to the detail along with a flowchart shown in FIGS. 5A and 5B.

Figure 6:
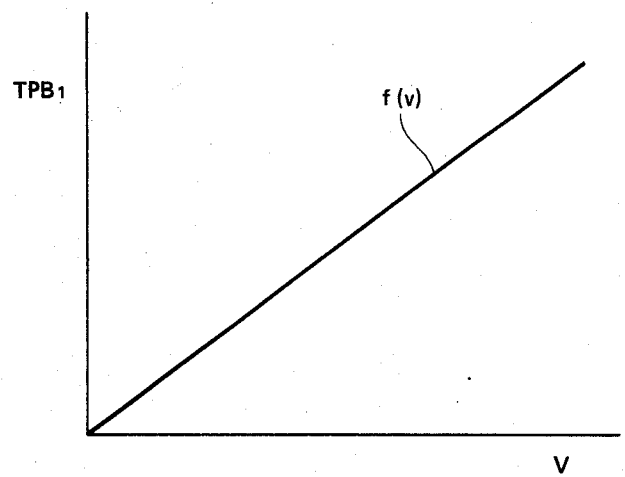
FIG. 6 is a graphical representation of a table data of $TPB_1$ versus vehicle speed V.

At a step 601, a decision is made wether a KBFLG (KB flag) is set or not. The KBFLG is set when a first rapid braking is detected. The first rapid braking state is established when a wheel deceleration (G) greater than a first relatively small value ($G_1$) is detected (see step 304) after a brake has been applied (see step 302). In this embodiment, the first relatively small value is set equal to 0.4 G. If KBFLG is not set, the program proceeds to a step 602 where a decision is made whether the brake is applied or not. If the brake is not applied, the program goes from the step 602 to a step 608 where a stepper motor operating position PH is given by subtracting a value $P_1$ from an actual stepper motor pulse number $P_A$. The value $P_1$ indicates a stepper motor pulse number when the stepper motor assumes a certain position at which the change-over switch changes from an Off state to an ON state or vice versa. As will be noted as the description proceeds further, the content of PH indicates the operating position assumed by the stepper motor at a moment when the brake is applied. After the step 608, the program proceeds to a step 610 where BC (BC timer) is set equal to zero, and then to a step 612 where the computer performs a table look-up operation of a table data as shown in FIG. 6 using the vehicle speed V detected by the vehicle speed sensor 302 and places the result at $TRB_1$. The content of $TPB_1$ is decreased at a step 655 (See FIG. 5B) and reset to a new value at the step 612. The content of $TRB_1$ indicates the length of time beginning with the moment when the application of brake is detected and during which the increment of the content of BC performed at a step 654 is suspended. After the step 612, the program proceeds to a step 650 where a decision is made whether LRFLG (LR flag) is set or not. This flag is set when a wheel lock is anticipated (see step 636) or a recovery of wheel lock is anticipated (see step 644). Since LRFLG is not set, the program proceeds to a step 652 where a decision is made whether the content of $TPB_1$ is equal to 0 or not. If $TPB_1$ is not equal to 0, the program proceeds to step 655 where the content of $TPB_1$ is decreased by 1. After the step 655, the program proceeds to the stepper motor drive routine 700. Since, under this condition when KBFLG is not set and the brake is not applied, the stepper motor 1110 is adjusted to an operating position indicated by a target pulse number $P_D$ which has been obtained in the ratio control routine 500.

Let us assume that the brake is applied and the wheel deceleration G is greater than the value G but not greater than a relatively great value $G_2$ and there occurs no wheel lock. In this embodiment, the second relatively great value $G_2$ is set equal to 1.0 G. Under this condition, the program proceeds from the step 601 to the step 602 and then to a step 604 where a decision is made whether the wheel deceleration G is greater than the second value $G_1$ or not. Since G is greater than $G_1$, the program proceeds to a step 606 where KBFLG is set and then to the step 650. Since LRFLG is not set, the program proceeds to the step 654 where the content of BC is increased by 1. Then, the program proceeds to the step 655 where the content of $TPB_1$ is decreased by 1. In the subsequent run, the program proceeds along the step 601, 614, 632 to a step 634. At the step 634, a decision is made whether the wheel deceleration G is greater than the second value $G_2$ or not. Since G is not greater than $G_2$, the program proceeds to a step 638 where a decision is made whether the vehicle wheel speed V is equal to 0 or not. Since there occurs no wheel lock and thus the wheel speed V stays greater than 0 until the vehicle comes to a halt, the program proceeds along the step 650, 654, 655 to the stepper motor drive routine 700. In the stepper motor drive routine 700, the stepper motor is rotated in downshift direction in accordance with the target pulse number $P_D$ determined in the ratio control routinbe 500. After the vehicle has come to a halt, since the wheel speed V becomes equal to 0, the program proceeds from the step 638 to a step 640 where an equation $P_H - K_1 \times BC + K_2 \times T_{ATF} + K_3 \times G$ (where $K_1$, $K_2$, $K_3$ are constants, and $T_{ATF}$ is transmission oil temperature) is calculated and the result is placed at $P_S$. Since the content of BC has a substantial value owing to the increment of BC at step 654 and the wheel deceleration G is 0, the content of $P_S$ is less than 0, so that the program goes from the step 642 to the step 650 and then proceeds along the step 654, 655 to the stepper motor drive routine 700.

Let us now assume that the automotive vehicle is being decelerated on a road having a high road friction coefficient with road wheels subjected to a deceleration G greater than the second value $G_2$. Immediately before the brake is applied to initiate the above-mentioned rapid or quick braking state, the steps 608, 610 and 612 are executed to set a pulse number $P_H$ indicative of an actual position assumed by the stepper motor 1110 immediately before or upon application of the brake, the content of BC is set equal to 0, and the content of $TPB_1$ is set after the table look-up operation of FIG. 6. After the brake has been applied, the program proceeds along step 601, 602, 604, 606, 650, 654, 655 to the stepper motor drive routine 700. This results in setting KBFLG. Thus, in the subsequent run, the program proceeds along step 601, 614, 632, 634, 636, 638, 650, 652, 655 to the stepper motor drive routine 700. This results in setting LRFLG at the step 636. After LRFLG has been set, the increment of the content of BC is suspended as long as the content of $TPB_1$ stays greater than 0 (see steps 650, 652, 655). After this run, since LRFLG has been set too, the program proceeds along step 601, 614, 632 to a step 615 where a decision is made whether the content of $TPB_1$ is equal to 0 or not. As long as the content of $TPB_1$ is greater than 0, the program proceeds from the step 615 to a step 616 where the equation $P_H - K_1 \times BC + K_2 \times T_{ATF} + K_3 \times G$ is calculated and the result is placed at $P_S$. Then, the program proceeds to a step 630 until one various release conditions at steps 618, 620, 622, and 624 is satisfied. At the step 630, the sum of $P_S$ and $P_1$ is placed at the target pulse number $P_D$. In other words, the content of the target pulse number $P_D$ determined in the ratio control routine 500 is replaced with the sum of $P_S$ and $P_1$. Thereafter, the program proceeds along the step 650, 652, 655 to the stepper motor drive routine 700 where the stepper motor is moved in such a direction as to adjust the actual pulse number $P_A$ toward $P_D$ which is set equal to $P_S + P_1$. Increment of BC (step 654) is suspended and thus the term $K_1 \times BC$ in the equation at the step 616 is small, whereas the transmission oil temperature $T_{ATF}$ and the wheel deceleration G are not small and thus the term $K_2 \times T_{ATF} + K_3 \times G$ is not small. Thus, the content of $P_S$, indicative of an estimated position of the stepper motor, stays greater than the content of $P_H$ which is set upon application of the brake. Therefore, since the content of $P_D$ becomes greater than the content of $P_H$, the stepper motor 1110 is rotated in upshift direction to establish a reduction ratio which is at most smaller than the reduction ratio established upon application of the brake. In other words, downshifting from the reduction ratio upon application of brake which would normally take place if the target pulse number $P_D$ determined in the ratio control routine 500 were continued to be used in the stepper motor drive routine 500 is prevented. The downshifting is prevented until elapse of time indicated by the content of $TPB_1$ which was set immediately before application of the brake and until one of the release conditions at steps 618, 620, 622, and 624 is satisfied. Referring to the release conditions, KBFLG and LRFLG are cleared when the content of $P_S$ becomes less than 0, viz., when the estimated position of the stepper motor 1110 indicates the largest reduction ratio, or the content of $P_D$ determined in the ratio control routine 500 becomes greater than or equal to the content of $P_S$, viz., when $P_D$ indicates a reduction ratio less than a reduction ratio indicated by $P_S$, or when the driver pulley revolution speed $N_t$ becomes greater than a predetermined value $N_{t0}$ and at the same time the vehicle wheel speed V is greater than $V_{10}$ (see steps 622, 624). When subsequently the vehicle comes to a halt and the brake is released, the program proceeds from the step 601 to the step 614 where a decision is made whether the brake is applied or not. Then, the program proceeds along step 616, 618, 620, 622, 624, 630, 650, 652, 655 to the stepper motor drive routine 700. After repeating the step 655, the content of $TPB_1$ becomes equal to 0 or less than 0. After the content of $TPB_1$ becomes equal to 0 or less than 0, the program proceeds along step 601, 614, 616, 618, 620, 622, 624, 630, 650, 652, 654, 655 to the stepper motor drive routine 700. Since the content of BC is increased at the step 654 and thus the content of $P_S$ determined at the 616 decreases, the stepper motor 1110 is rotated in downshift direction, causing the transmission to downshift toward the largest reduction ratio. If the transmission establishes the largest reduction ratio, the program goes from the step 616 via the step 618 or 620 to the step 626 where KBFLG is cleared and then to the step where LRFLG is cleared. Thereafter, the program proceeds along the step 650, 654, 655 to the stepper motor drive routine 700.

From the above description, it will be appreciated that, since the downshifting is prevented and thus a decrease in hydraulic fluid pressure applied to the driver pulley chamber is prevented, the occurrence of slip of the V-belt relative to the driver and follower pulleys is prevented. It will also appreciated that the transmission begins to downshifts toward the largest reduction ratio after elapse of time indicated by the content of $TPB_1$ which begins with the application of brake.

If, during the braking operation discussed above, the brake is released and the accelerator pedal is depressed for accelerating, the program proceeds along step 601, 614, 616, 618, 620, 622, 624, 626, 628, 650, 654, 655 to the stepper motor drive routine 700. In the subsequent run, the program proceeds along step 601, 602, 608, 610, 612, 630, 654, 655 to the stepper motor drive routine 700. Thus, the stepper motor 1110 is rotated immediately toward a position to establish a reduction ratio indicated by the content of $P_D$ determined in the ratio control routine 500.

Let us assume that the automotive vehicle is being decelerated on a road having a low friction coeffecient so that the road wheels is subsequently locked and kept locked thereafter until the vehicle comes to a halt. It is also assumed that the wheel deceleration G becomes greater than $G_1$ but it fails to become greater than $G_2$. Under this condition, the program proceeds along the step 601, 602, 604, 606, 650, 654, 655 whereby KBFLG is set. After KBFLG has been set, the program proceeds along the step 601, 614, 632, 634 to the step 638 where decision is made whether the wheel deceleration is equal to 0 or not. If, now, the wheel has locked and thus the wheel speed V becomes 0, the program goes from the step 638 to the step 640 and then via the step 642 to the step 644 where LRFLG is set. Then, the program proceeds along the step 650, 652, 655 to the stepper motor drive routine 700. After the LRFLG has been set, the program proceeds in the subsequent runs along the step 632, 615, 622, 630, 650, 652, 655 to the stepper motor drive routine 700. This processing flow is maintained till the elapse of time indicated by the content of $TPB_1$. Thus, since the target pulse number $P_D$ is set equal to the sum of $P_S$ and $P_1$ at the step 630 and the stepper motor is controlled in accordance with the sum of $P_S$ and $P_1$, the downshifting from a reduction ratio that is indicated by the content of $P_H$ is prevented until the length of time indicated by the content of $TPB_1$ elapses. After the elapse of the length of time indicated by $TPB_1$, since the program goes from the step 652 to the step 654, and in the subsequent run the program proceeds along the step 601, 614, 632, 615, 650, 652, 654, 655 to the stepper motor drive routine 700 bypassing the step 630, so that the content of $P_D$ determined in the ratio control routine 500 is not corrected and the stepper motor 1110 is adjusted toward the pulse number indicated b $P_D$. Thus, the transmission starts downshifting in accordance with the content of $P_D$ determined in the ratio control routine 500 after the elapse of the length of time indicated by $PTB_1$. When subsequently the brake is released, the program goes from the step 614 to steps 626 and 628 via the step 618 or via the steps 618 and 620. Since the increment to BC is repeated after elapse of time indicated by $PTB_1$ at the step 655, the content of $P_S$ immediately decreases and thus one of the conditions at the steps 618 and 620 is immediately satisfied after the elapse of time indicated by $PTB_1$. Thus, KBFLG and LRFLG are reset upon release of the brake after the vehicle has come to a halt.

Let us now assume that the automotive vehicle is being decelerated on a road having a low friction coeffecient so that the road wheels is locked and subsequently the vehicle enters a road having a rhigh friction coefficient so that the rotation of the wheel resumes before the vehicle comes to a halt. It is also assumed that the wheel deceleration G becomes greater than $G_1$ but it fails to become greater than $G_2$. Similarly to the above-mentioned case, after KGFLG and LRFLG have been set, the program proceeds along the step 601, 614, 632, 616, 616, 618, 620, 622, 630, 650, 652, 655 and this processing flow maintains until the length of time indicated by $PTB_1$ expires. Since the downshifting is prevented and thus the hydraulic fluid pressure supplied to the driver pulley is kept high until the length of time indicated by $PTB_1$ expires, even if the wheels are force to rotate after the vehicle enters the road having the high friction coefficient, the slip of the V-belt will not take place. This is because the friction between the V-belt and the follower pulley and the friction between the V-belt and the driver pulley are maintained at high levels. After the elapse of the time indicated by $TPB_1$, since the step 630 is bypassed, the stepper motor drive routine 700 is executed with the content of $P_D$ that is determined by the ratio control routine 500 so that the transmission downshifts toward the largest reduction ratio in accordance with the content of $P_D$ determined in the ratio control routine 500.

Although the length of time ($TPB_1$) during which the increment of BC timer is suspendedindicated by the content of $TPB_1$ starts with the application of brake (at step 602) during the routine 600 shown in FIGS. 5A and 5B, the length of time can start with setting of the LRFLG at the step 644. This modification is described further along with a flow chart of a modified control routine 600A shown in FIGS. 7A and 7B.

Figure 8:
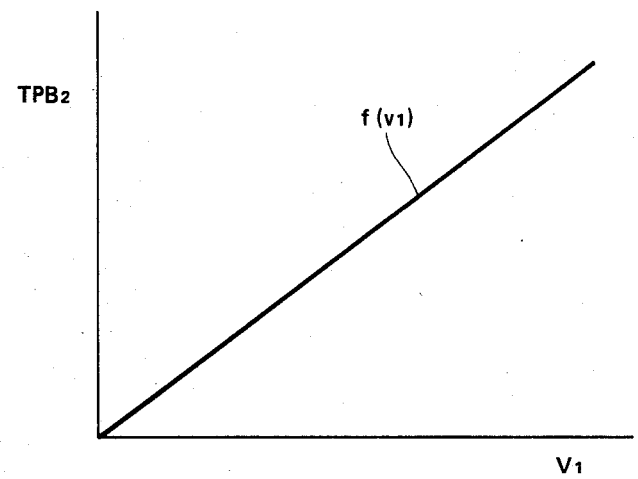
FIG. 8 is a graphical representation of a table data of $TPB_2$ versus vehicle speed value $V_1$.
Figure 7A:
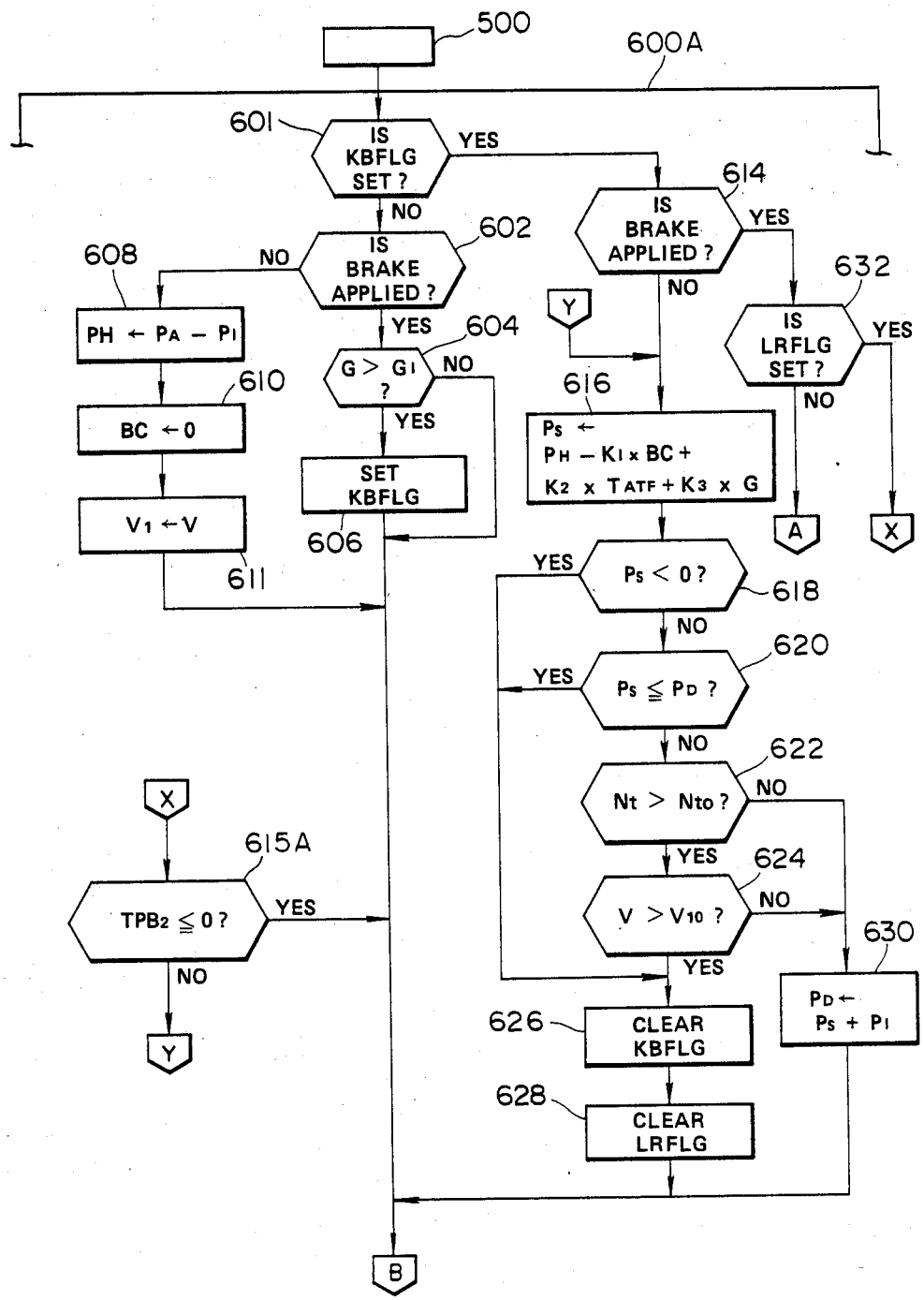
FIG. 7A and 7B, when combined, illustrate a flowchart of a modification of the control routine for rapid braking.
Figure 7B:
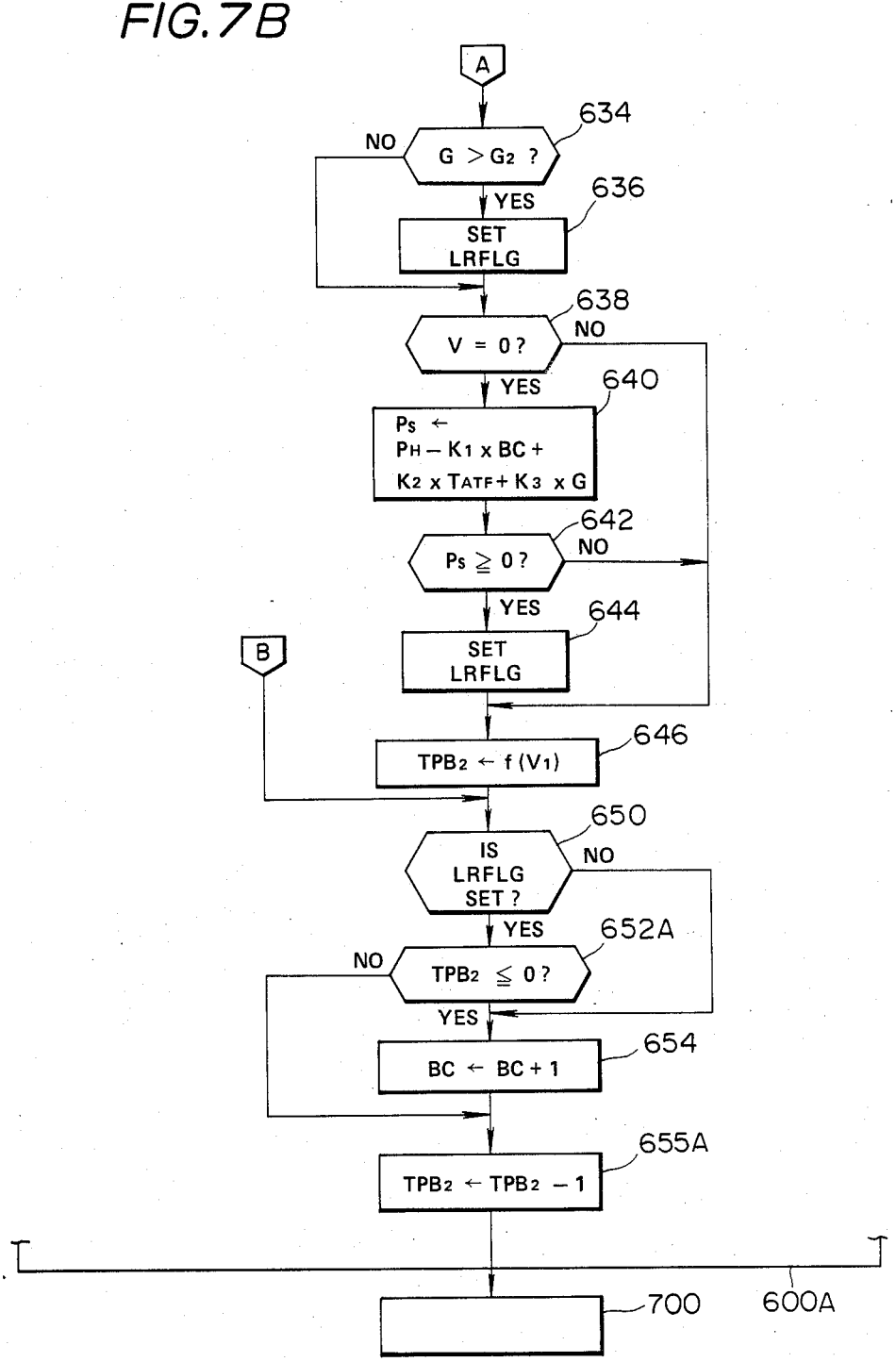

Referring to FIGS. 7A and 7B, this control routine 600A is substantially the same as the control routine 600 shown in FIGS. 5A and 5B except the following facts. The step 612 shown in FIG. 5A has beem omitted in the control routine 600A as shown in FIG. 7A, whereas a new step 611 has been inserted instead as shown in FIG. 7A. At the step 611, the wheel speed V detected immediately before the application of brake is placed at $V_1$. The content of $V_1$ is used at a step 646 shown in FIG. 7B. As shown in FIG. 7B, the step 646 is inserted such that after LRFLG is has been set at step 636 or 644, the program comes to this step 646 where based on the content of $V_1$, indicative of the vehicle speed immediately before the application of brake, the table look-up operation of FIG. 8 is performed and the result is placed at $TPB_2$. The step 615 has been replaced with a step 615A, the step 652 has been replaced with a step 652A, and the step 655 has been replaced with a step 655A. According to the control routine 600A, after the LRFLG has been set, the decrement of the content of $TPB_2$ starts (see the step 650, 652A, 655A) and as long as the content of $TPB_2$ stays greater than 0, the downshifting of the transmission is prohibited (see the step 632, 615A, 616, 618, 620, 622, 630, 650 for example). Thus, this control routine 600A is different from the control routine 600 mainly in that the length of time ($TPB_2$) during which the increment of BC timer is suspended and thus the downshifting of prohibited starts with the setting of LRFLG according to the control routine 600A, whereas the length of time ($TPB_1$) starts with the setting of KBFLG according to the control routine 600.

Figure 9A:
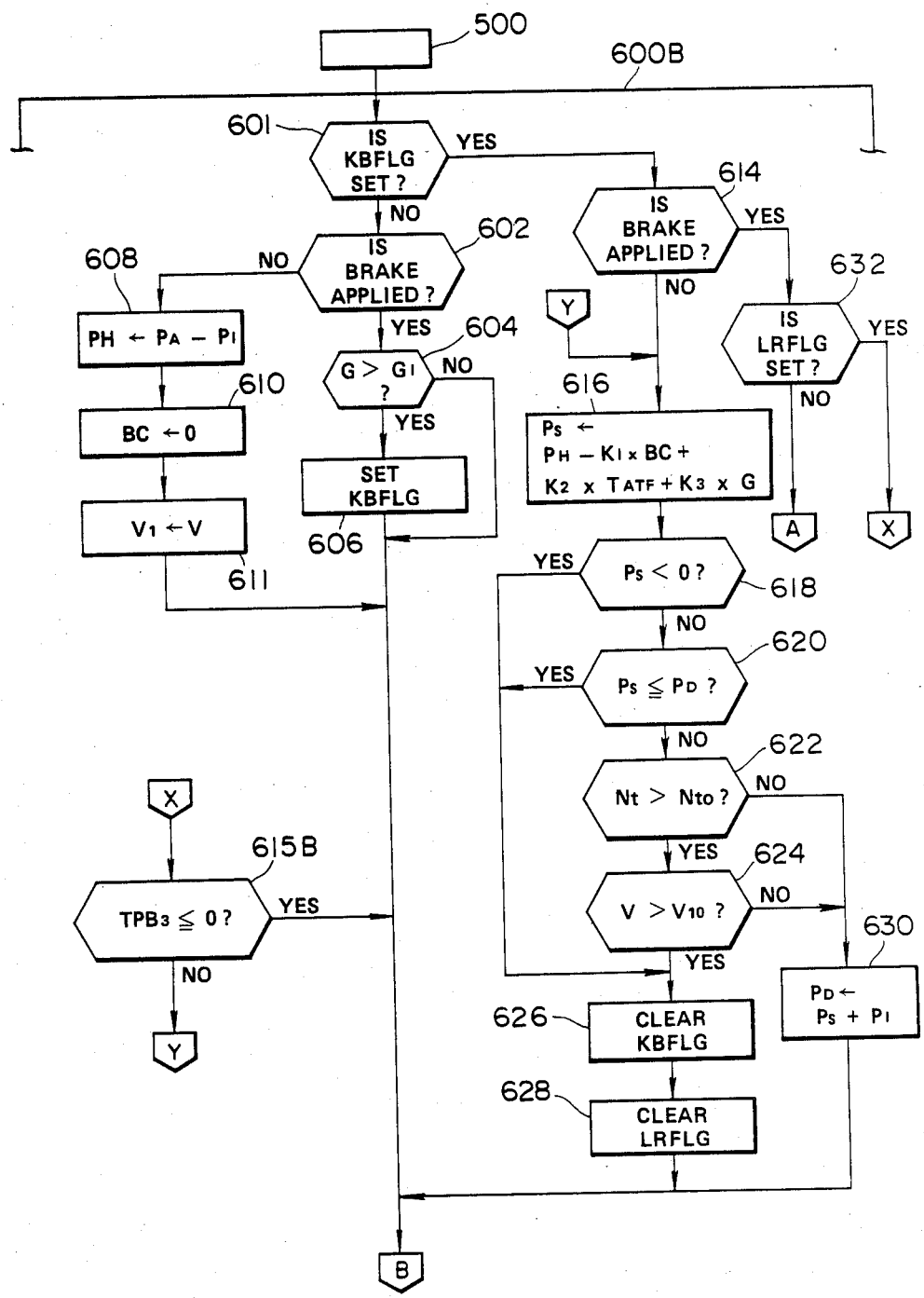
FIGS. 9A and 9B, when combined, illustrate a flowchart of a modification of the control routine for rapid braking.
Figure 9B:
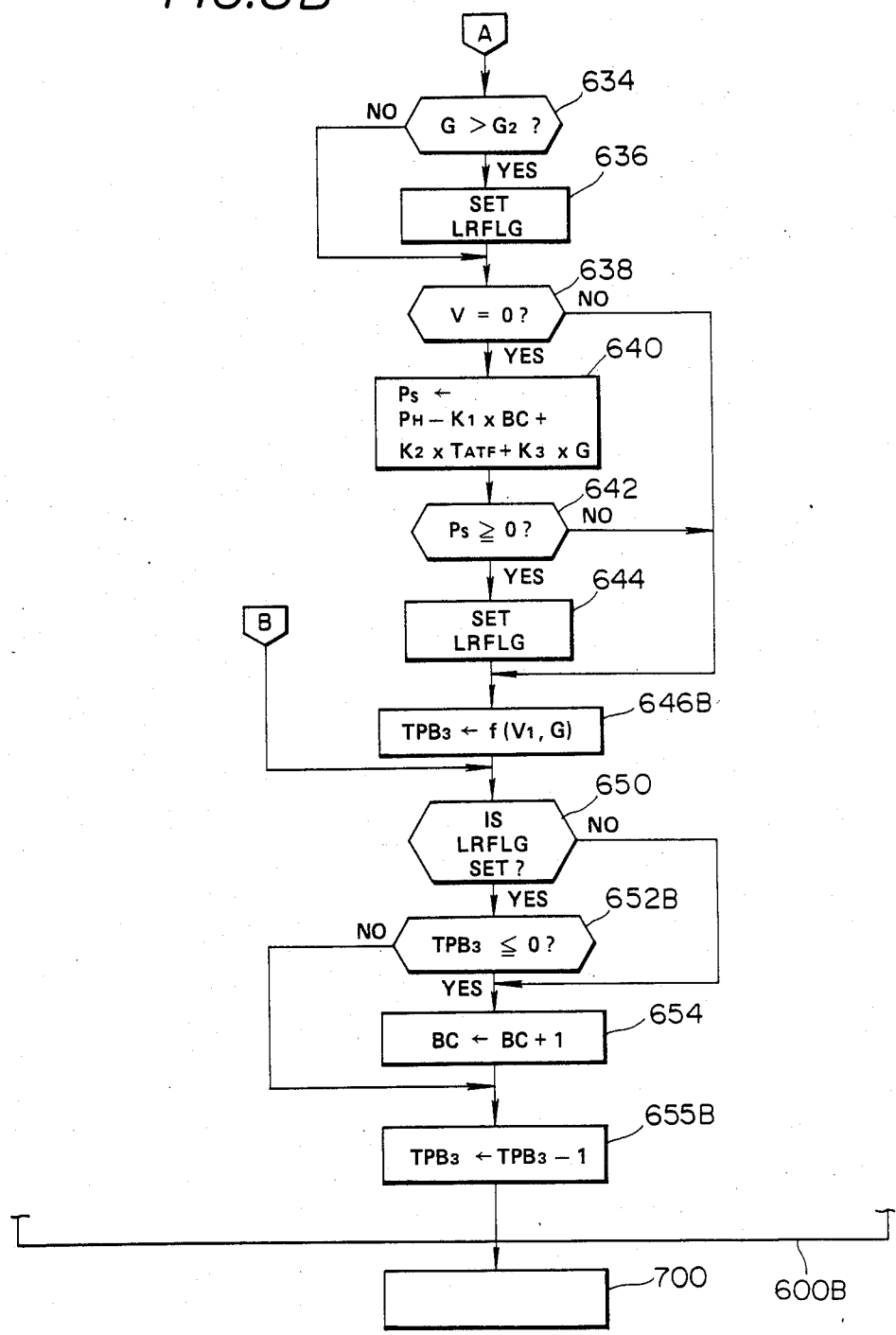
Figure 10:
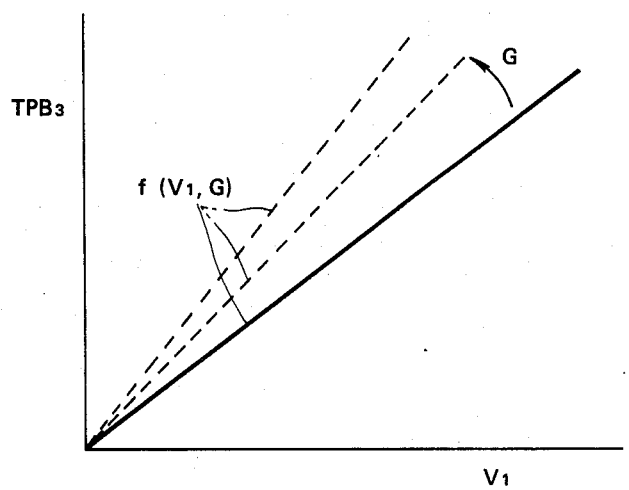
FIG. 10 is a graphical representation of a table data of $TPB_3$ versus vehicle speed value $V_1$.

Referring to FIGS. 9A and 9B, a modified control routine 600B is described. This control routine 600B is substantially the same as the above-mentioned control routine 600A. However, the step 646 shown in FIG. 7B has been replaced with a step 646B where based on the content of $V_1$ determined in a step 611 (see FIG. 9A) and a wheel deceleration G, a table look-up operation of FIG. 10 is performed and the result is placed at $TPB_3$. It is also be noted that the step 615A has been replaced with a step 615B, the step 652A has been replaced with a step 652B, and the step 655A has been replaced with a step 655B. The control routine 600B is therefore different from the control routine 600A only in that the length of time ($TPB_3$) which starts with setting of LRFLG is variable not only with vehicle wheel speed but also with deceleration (G) according to the control routine 600B.

According to the previously described control routines 600, 600A, and 600B, LRFLG is set when the wheel deceleration G has exceeded the second predetermined value $G_2$ or when the wheel locks (V=0) and the content of $P_S$ is not less than 0, viz, the estimated position of the driver pulley does not reach a position corresponding to the largest reduction ratio.

Figure 11A:
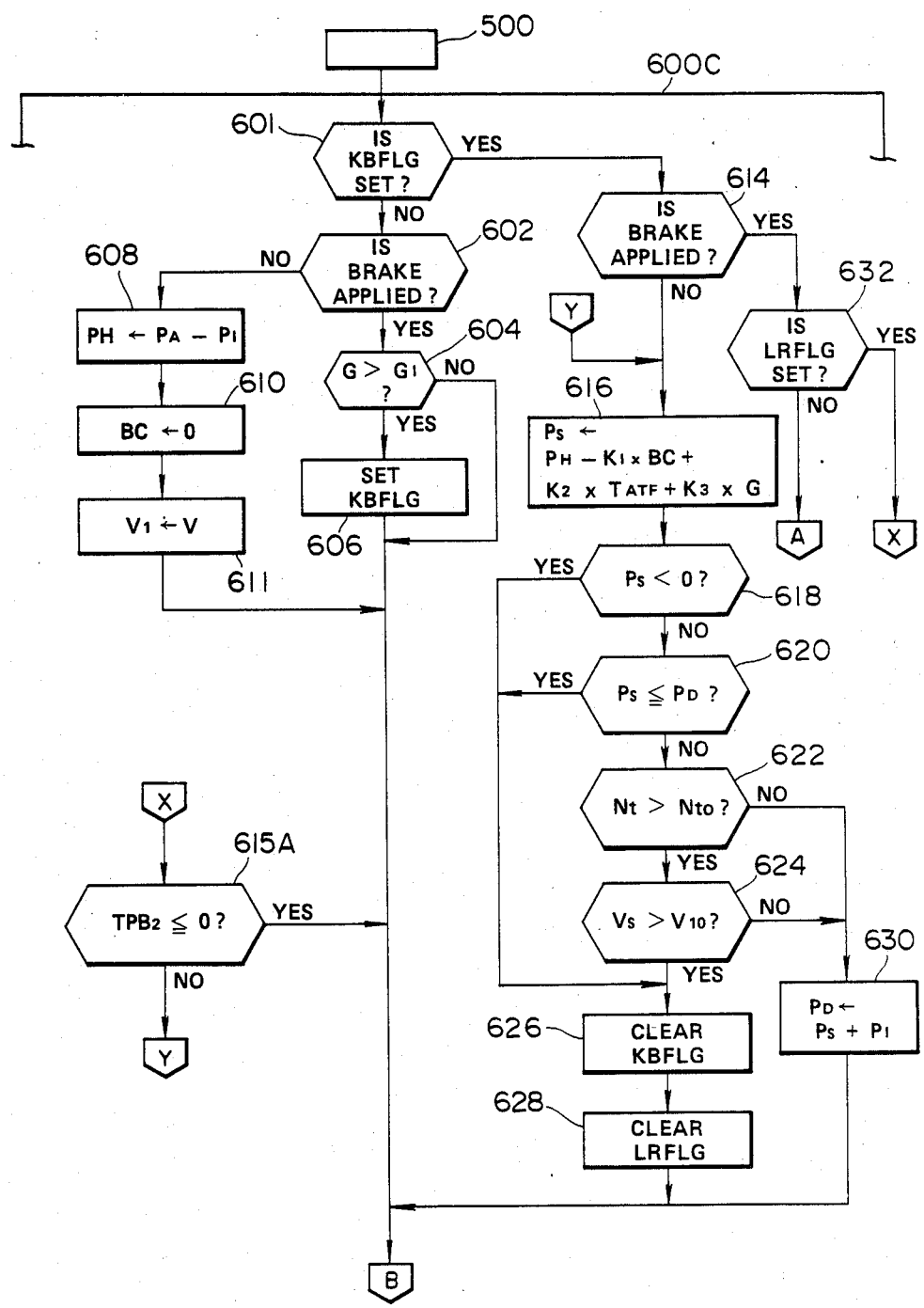
FIGS. 11A and 11B, when combined, illustrate a flowchart of a modification of the control routine for rapid braking.
Figure 11B:
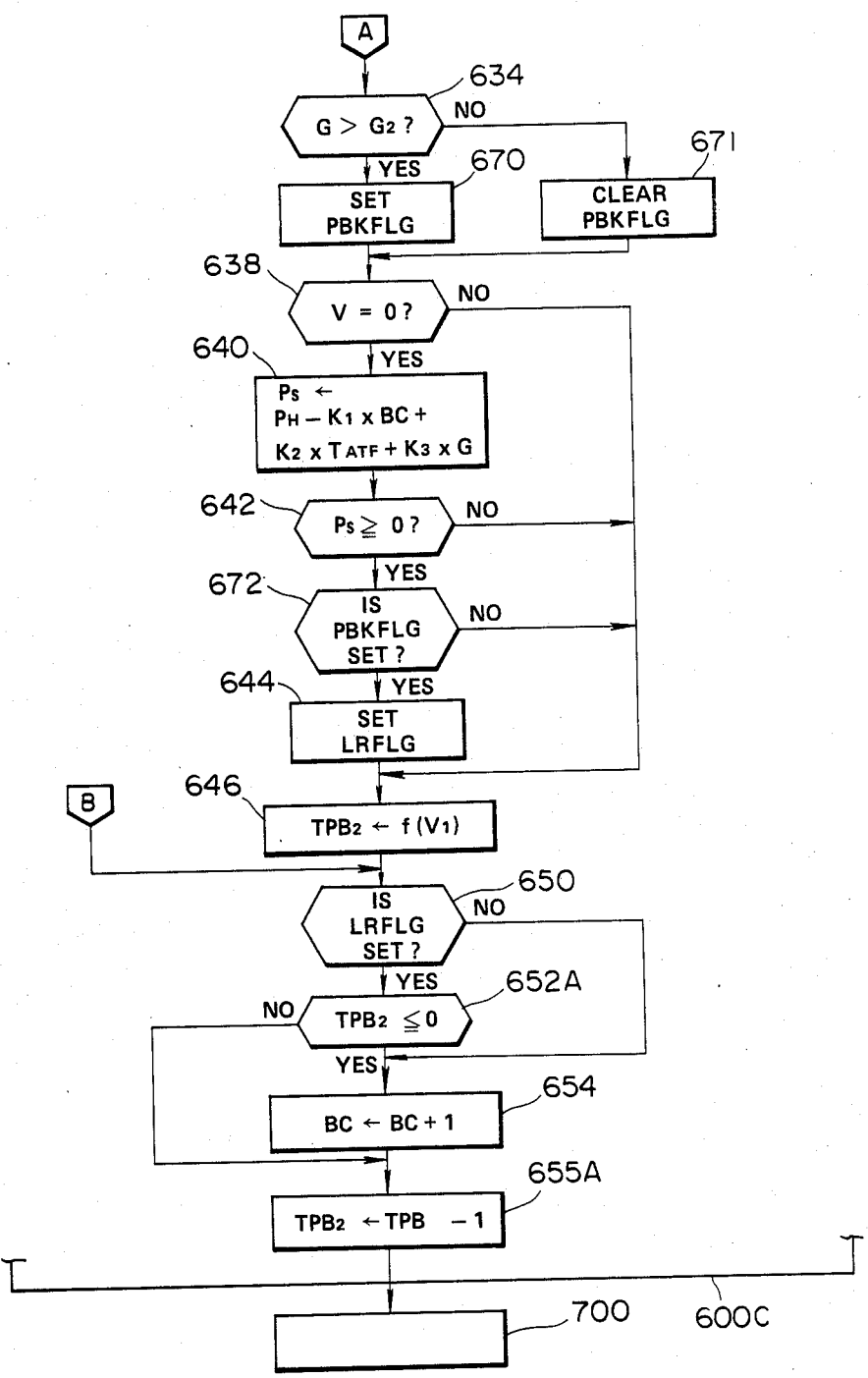

According to a control routine 600C which will be described along with a flowchart shown in FIGS. 11A and 11B, LRFLG is set when the wheel deceleration (G) exceeds a second predetermined value ($G_2$), the wheel locks (V=0), and $P_S$ is not less than 0.

The control routine 600C is substantially the same as the control routine 600A shown in FIG. 7A and 7B. However, the step 636 shown in FIG. 7B has been omitted and instead steps 670 and 671 have been inserted between steps 634 and 638 in the control routine 600C as shown in FIG. 11B. Besides, a judgement step 672 has been inserted between steps 642 and 644 as shown in FIG. 11B. Referring to FIG. 11B, if a wheel deceleration G is greater than a second predetermined value $G_2$ at the step 634, PBKFLG is set at the step 670, whereas if the wheel deceleration is not greater than the second predetermined value $G_2$, PBKFLG is cleared at the step 671. If the wheel locks and the wheel speed V is 0. The program proceeds along step 638, 640, 642, 672 to the step 644 provided $P_S$ is not less than 0 and PBKFLG has been set at the step 670. It will be noted that in the other control routines 600 and 600B, if it is desired to alter the conditions under which LRFLG is set, what you have to do is to modify the flow by removing the step 636 and insert steps 670, 671, 672 shown in FIG. 11B in the same manner as in FIG. 11B.

In the previously described control routines 600, 600A, 600B and 600C, $P_S$ is given after calculating the predetermined equation. Since what is indicated by $P_S$ is an estimated position of a movable conical disc of the driver or follower pulley, if an acutal position of the movable conical disc of the pulley can be detected, the result detected may be used instead of $P_S$.

The length of time ($TPB_1$ or $TPB_2$ or $TPB_3$) should be set sufficiently longer than a time from the moment when the vehicle running at a certain vehicle speed starts sliding on a road owing to rapid braking to the moment when the vehicle comes to a halt.

From the preceding description, it will be appreciated that the V-belt connecting between the driver and follower pulleys of the continuously varibale transmission will not slip, during application of rapid or quick braking, owing to the fact the frictions between the V-belt and the driver and follower pulleys are maintained high by prohibiting downshifting after predetermined conditions have been satisfied after application of brake.

What is claimed is:

1. A control system for a continuously variable transmission for an automotive vehicle with a brake, including a hydraulically operable driver pulley and follower pulley, a V-belt tensioned between the driver and follower pulleys, and means, including a shift actuator and a shift control valve, for hydraulically controlling a reduction ratio between the driver and follower pulleys by controlling a ratio of hydraulic fluid pressure applied to the driver pulley to hydraulic fluid pressure applied to the follower pulley, the control system comprising:
   means for generating an output signal upon application of the brake of the vehicle; and
   means for controlling the shift actuator such that the continuously variable transmission is prohibited against effecting downshifting after predetermined conditions have been satisfied after application of the brake as indicated by said output signal generated by said output signal generating means.

2. A control system as claimed in claim 1, wherein a position of a movable concical disc of one of the driver and follower pulleys is determined and the shift actuator is adjusted toward a position corresponding to the position of the movable conical disc determined for a predetermined length of time after said predetermined conditions have been satisfied after the application of the brake.

3. A control system as claimed in claim 2, wherein said predetermined length of time is determined as a function of at least a vehicle speed and a wheel deceleration.

4. A control system as claimed in claim 3, wherein the length of time is set longer than a time from the moment when the vehicle brake is applied to the moment when the vehicle comes to a halt during which the brake is kept applied.

5. A control system as claimed in claim 4, wherein said position of the movable conical disc of the pulley is determined by calculating an equation containing as variables a length of time from the application of the brake till the instance when said predetermined conditions are satisfied, a wheel deceleration and a transmission oil temperature of the continuously variable transmission.

6. A control system as claimed in claim 5, wherein, when the brake is kept applied upon elapse of the predetermined length of time, the continuously variable transmission is allowed to effect downshifting toward the largest reduction ratio.

7. A control system as claimed in claim 1, wherein said predetermined conditions are satisfied when a braked wheel stops rotating while the vehicle is still moving.

8. A control system as claimed in claim 7, wherein, when the brake is kept applied upon elapse of the predetermined length of time, the continuously variable transmission is allowed to effect downshifting toward the largest reduction ratio.

9. A control method for a continuously variable transmission for an automotive vehicle with a brake, including a hydraulically operable driver pulley and follower pulley, a V-belt tensioned between the driver and follower pulleys, and means, including a shift actuator and a shift control valve, for hydraulically controlling a reduction ratio between the driver and follower pulleys by controlling a ratio of hydraulic fluid pressure applied to the driver pulley to hydraulic fluid pressure applied to the follower pulley, the control method comprising the steps of:
   generating an output signal upon application of the brake of the vehicle; and
   controlling the shift actuator such that the continuously variable transmission is prohibited against effecting downshifting after predetermined conditions have been satisfied after application of the brake as indicated by said output signal.

* * * * *